(12) United States Patent
Robinson et al.

(10) Patent No.: US 7,451,635 B2
(45) Date of Patent: Nov. 18, 2008

(54) SENSOR ASSEMBLY WITH INSERT MOLDED BEAD

(75) Inventors: Terry L. Robinson, Bourbonnais, IL (US); Ronald M. Smith, Frankfort, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 11/651,850

(22) Filed: Jan. 10, 2007

(65) Prior Publication Data

US 2007/0220982 A1 Sep. 27, 2007

Related U.S. Application Data

(60) Provisional application No. 60/782,760, filed on Mar. 16, 2006.

(51) Int. Cl.
*G01M 3/34* (2006.01)

(52) U.S. Cl. .................................................. 73/49.3
(58) Field of Classification Search ................ 73/49.3, 73/52, 700, 706, 747
See application file for complete search history.

(56) References Cited

U.S. PATENT DOCUMENTS 5,964,023 A * 10/1999 Simpson et al. ............... 29/511
6,450,011 B1 * 9/2002 Mayer et al. .................. 73/49.3

* cited by examiner

*Primary Examiner*—Andre J. Allen
(74) *Attorney, Agent, or Firm*—Mark W. Croll; Paul F. Donovan

(57) ABSTRACT

A sensor assembly suitable for a vehicle fuel module assembly includes a plastic body defining a bore therethrough and having a barrier with a continuous peripheral edge encapsulated in the body. An aperture extends through the plate. A sensor chip is bonded to the plate over the aperture.

17 Claims, 2 Drawing Sheets

SENSOR ASSEMBLY WITH INSERT MOLDED BEAD

CROSS-REFERENCE TO RELATED APPLICATIONS

The present regular United States Patent Application claims the benefits of U.S. Provisional Application Ser. No. 60/782,760 filed on Mar. 16, 2006.

FIELD OF THE INVENTION

The present invention relates generally to sensor devices and, more particularly, to automobile fuel system fuel tank module pressure sensors having insert molded components.

BACKGROUND OF THE INVENTION

Automobiles are known to include fuel tank module assemblies as part of the fuel system. The module assembly may include a fuel pump and a fuel level sensor, along with a pressure sensor. For the pressure sensor, it is known to provide a hole in the fuel tank module and a pressure sensor assembly installed in the hole. The pressure sensor assembly includes an outer body or housing, which may be of plastic, and defines a bore extending therethrough. The housing further defines a pocket in flow communication with the bore. A pressure sensor chip is installed in the pocket to sense pressure changes via the bore. Circuitry in the chip can be used to sense flexing of a diaphragm-like structure on a surface of the chip in response to pressure changes in the bore. Oven-cured epoxy has been used to secure the chip in the pocket.

It can be problematic to adhere a sensor chip directly to a plastic sensor assembly housing. Plastic is susceptible to thermal expansion during operation and/or as a result of changes in the ambient environment, Expansion and contraction of the plastic housing can interfere with the bond to the sensor chip. Accordingly, it has been known to provide a glass barrier having an aperture therethrough in fluid flow communication with the bore in the housing. The glass barrier is secured in the bottom of the pocket as an intermediate component between the plastic housing and the sensor chip. Barriers of this type have been referred to as a "bead". The glass barrier is secured in the bottom of the pocket formed in the housing, and the pressure sensing chip is attached over the aperture in the glass barrier to be in fluid flow communication with the bore in the sensor assembly housing.

The use of a glass barrier as described above can also have disadvantages under some conditions. Different thermal expansion rates between the glass and the plastic housing can cause operational difficulties under some conditions. Metal barriers have been found as suitable replacements for glass barriers, to overcome some of the operational difficulties from thermal expansion and contraction of glass beads. A metal barrier, also referred to as a "bead", is secured in the bottom of the housing pocket in the same way as glass beads have been, and includes an aperture in flow communication with the bore in the housing.

It has been known for leakage to occur around metal barriers or beads in automobile fuel systems, interfering with proper operation of the pressure sensor system. In a sensing device as described, leakage of air, fuel vapor or the like can cause the sensor device to function improperly due to the loss of pressure or the loss of vacuum due to venting passed the barrier. Leakage has been found to occur apart from any abnormal physical changes due to expansion or contraction of the housing or the metal bead. Since the occurrence of leakage has been somewhat random, it has been necessary to pressure test all assemblies before installation.

SUMMARY OF THE INVENTION

The present invention provides a sensor device including a metal barrier for holding a sensor chip, with the barrier embedded across a bore in a sensor body, with body material encapsulating a perimeter of the metal barrier and the barrier extending past the bottom of a pocket holding the chip.

In one aspect thereof, the present invention provides a sensor assembly with a body defining a bore therethrough and a barrier covering an end of the bore. The barrier includes first and second faces on opposite sides thereof, and a peripheral edge surface. The barrier further defines an aperture extending therethrough between the first and second faces in flow communication with the bore. A peripheral portion of the barrier is substantially completely encapsulated in the body, including the peripheral edge surface of the barrier and peripheral surface portions of the first and second faces adjacent the peripheral edge surface.

In another aspect thereof, the present invention provides a sensor assembly with a body of plastic material defining a bore therethrough and a metal bead across the bore. The bead includes opposite faces and a peripheral edge surface. Peripheral portions of the first and second faces and the peripheral edge surface are encapsulated in plastic material of the body.

In a still further aspect thereof, the present invention provides a fuel tank pressure sensor assembly with a body having a bore therethrough and a barrier across the bore. The barrier defines an aperture therethrough in flow communication with the bore. The body defines a pocket on one side of the barrier opposite the bore, the pocket defined by a sidewall. The barrier has an edge portion encapsulated in the body, the encapsulated edge portion extending beyond the sidewall of the pocket.

An advantage of the present invention, in one form thereof, is providing a sensor device that can be manufactured efficiently with known manufacturing techniques.

Another advantage of a form of the present invention is providing a sensor device for automobile fuel systems that minimizes leakage through the sensor.

Other features and advantages of the invention will become apparent to those skilled in the art upon review of the following detailed description, claims and drawings in which like numerals are used to designate like features.

Figure 1:
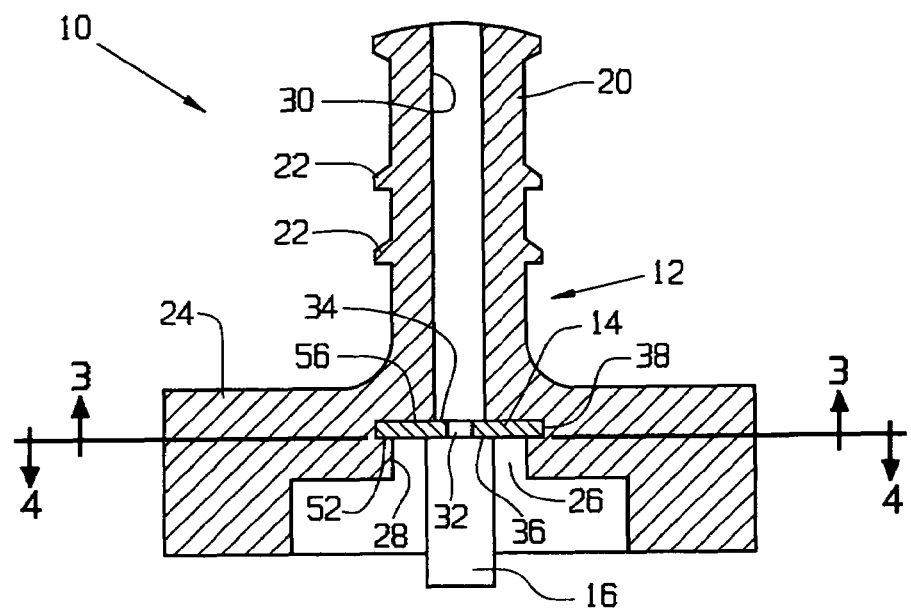
FIG. 1 is a cross-sectional view of a sensor assembly in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a sensor assembly in accordance with the present invention. Sensor assembly 10 includes a sensor body 12, a barrier or bead 14 and a sensor chip 16.

Body 12 includes an elongated neck 20 having external ribs 22 for installation in a hole of a fuel system module (not shown). At one end of neck 20, body 12 expands to form a base 24 defining a pocket 26 having a sidewall 28. An axial bore 30 extends through neck 20 and is in fluid flow communication with pocket 26. In the exemplary embodiment, body 12 is made of fuel resistant plastic by injection molding or the like. However, it is believed that the present invention will have applicability and use for sensor assemblies of other types than that shown, and for other uses. Accordingly, the sensor body or other unit in which the invention is applied can be made in other shapes and forms and of different materials.

Barrier or bead 14 is a metal plate having a hole or aperture 32 therein. Aperture 32 can be provided of a selected size for operation with sensor chip 16, and in the exemplary embodiment aperture 32 is a smaller than bore 30. Bead 14 includes first and second faces 34, 36 on opposite sides thereof, and an edge surface 38 about the periphery of bead 14. Bead 14 establishes a substrate or intermediate mounting structure between body 12 and sensor chip 16. Aperture 32 extends through bead 14 from face 34 to face 36. Bead 14 is of sufficient size to cover an entire bottom of pocket 26, and accordingly bead 14 extends beyond sidewall 28.

Bead 14 is secured in body 12 by insert molding, whereby bead 14 is held in a fixed position in a mold cavity while molten plastic flows around bead 14 to create neck 20 and base 24, with bore 30 and pocket 26 therein, respectively. Accordingly, a substantially continuous peripheral edge portion of bead 14 is encapsulated in the plastic of body 12. Body 12 is intimately adhered to a continuous edge portion of face 34 and to a continuous edge portion of face 36, each completely and continuously surrounding the perimeter of bead 14. Additionally, body 12 is intimately associated with edge surface 38 completely surrounding bead 14.

Chip 16 is secured to face 36 of the bead 14 in pocket 26 by adhesive bonding or the like. Chip 16 covers aperture 32, and chip 16 is thereby exposed to pressure changes in bore 30 via aperture 32 in bead 14.

Figure 2:
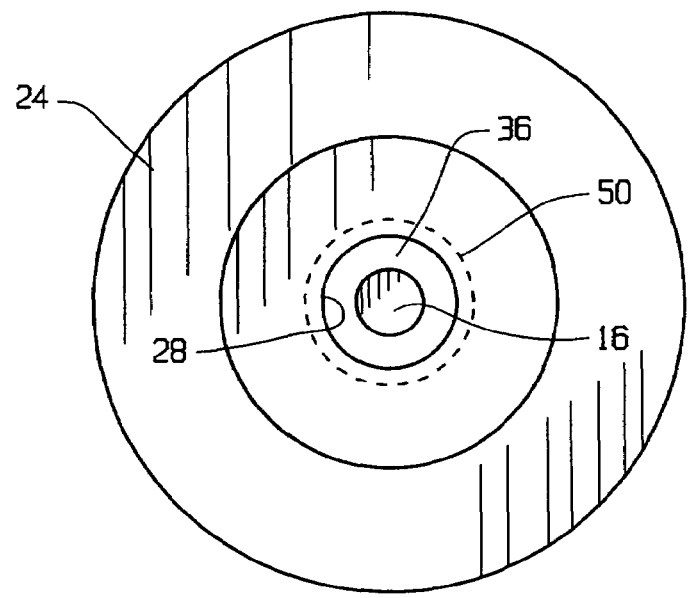
FIG. 2 is an end view of the sensor assembly shown in FIG. 1.
Figure 3:
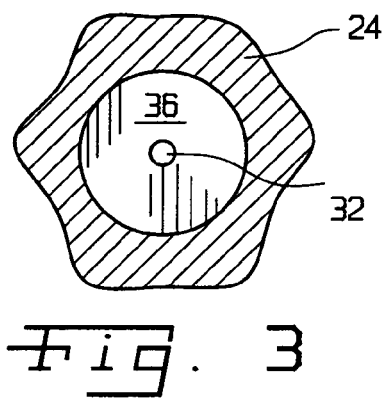
FIG. 3 is a fragmentary cross-sectional view of the sensor assembly taken in the direction indicated by line 3-3 in FIG. 1.
Figure 4:
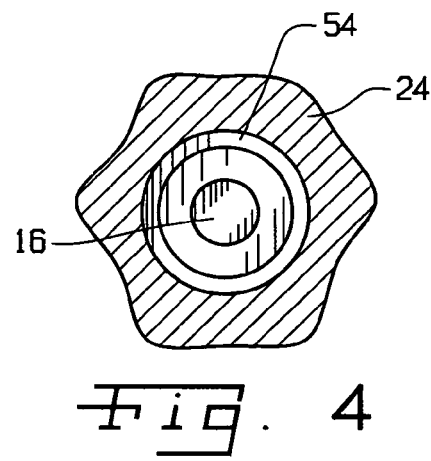
FIG. 4 is a fragmentary cross-sectional view of the sensor assembly taken in the direction indicated by line 4-4 in FIG. 1.
Figure 5:
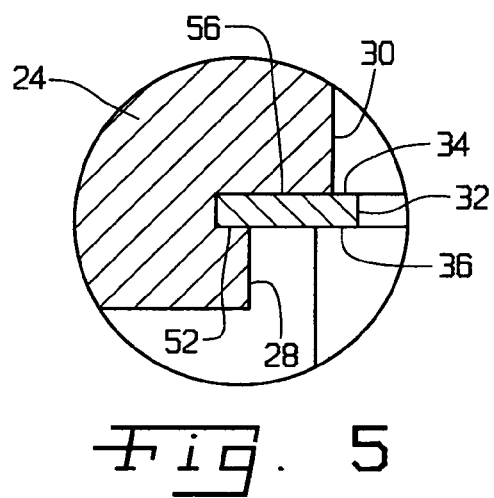
FIG. 5 is an enlarged, fragmentary. cross-sectional view of the edge of a metal bead in the sensor assembly.

FIG. 2 identifies the outer edge of bead 14 via a dotted line 50. As can be seen, the edge of bead 14 extends beyond the perimeter of pocket 26 as defined by sidewall 28. A continuous annular interface 52 is established between an annular surface portion of surface 36 and an annular portion 54 (FIG. 4) of body 12. Interface 52 extends along surface 36 from the edge of bead 14 (depicted by dotted line 50) to sidewall 28. A continuous annular interface 56 is established between an annular surface portion of surface 34 and body 12. Interface 56 extends along surface 34 from the edge of bead 14 (depicted by dotted line 50) to bore 30.

In the exemplary embodiment, interface 52 is narrower than interface 56. However, it should be understood that different proportional relationships between interfaces 52, 56 can be used, including ones in which substantially similar areas are defined and ones in which interface 52 is larger than interface 56.

Figure 6:
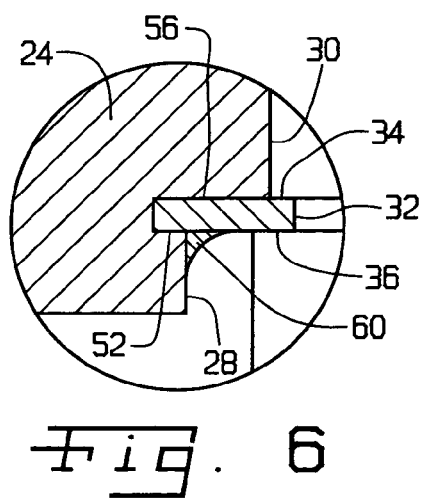
FIG. 6 is an enlarged view similar to that of FIG. 5, but illustrating a further embodiment of the present invention.

FIG. 6 illustrates a further embodiment in which a substantially continuous strip of sealant 60 is used in pocket 26, bonded to sidewall 28 and bead 14 to provide a further seal between bead 14 and body 12.

Bead 14 can be of a variety of shapes. However, in some installations a round shape can reduce susceptibility to stress failures. Bead 14 is configured and arranged to completely cover bore 30, establishing fluid flow communication between bore 30 and pocket 26 only via aperture 32 in bead 14.

It should be understood that the seal established between body 12 and barrier 14 need not be completely hermetic for some applications. However, a sensor assembly of the present invention establishes known consistent seal efficiency for proper operation of a device, such as a fuel system module for an automobile.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A sensor assembly comprising:
   a body defining a bore therethrough;
   a barrier covering an end of said bore, said barrier including first and second faces on opposite sides thereof, and a peripheral edge surface, said barrier further defining an aperture extending therethrough between said first and second faces in flow communication with said bore; and
   a peripheral portion of said barrier being completely encapsulated in said body, including said peripheral edge surface of said barrier and peripheral surface portions of said first and second faces adjacent said peripheral edge surface.

2. The sensor assembly of claim 1, said aperture and said bore having an aperture diameter and a bore diameter, respectively, and said aperture diameter being smaller than said bore diameter.

3. The sensor assembly of claim 1, peripheral surface portions of said first and second faces establishing first and second interfaces with said body, said first and second interfaces having first and second interface widths, respectively; and, said first and second interface widths being different.

4. The sensor assembly of claim 3, including a substantially continuous strip of sealant bonded to said body and said barrier.

5. The sensor assembly of claim 4, said substantially continuous strip of sealant being provided on said face establishing a narrower width interface with said body.

6. The sensor assembly of claim 1, said body being plastic.

7. The sensor assembly of claim 1, said barrier being metal.

8. The sensor assembly of claim 1, said body being plastic and said barrier being metal.

9. A sensor assembly comprising:
a body of plastic material defining a bore therethrough;
a metal bead across said bore, said bead including opposite faces and a peripheral edge surface, said bead defining an aperture therethrough in flow communication with said bore, and peripheral portions of said first and second faces and said peripheral edge surface being encapsulated in plastic material of said body; and
a pressure sensing chip attached to said bead and covering said aperture.

10. The sensor assembly of claim 9, including a sealant strip along a juncture between said body and one of said first and second faces.

11. A fuel tank pressure sensor assembly comprising:
a body having a bore therethrough;
a barrier across said bore, said barrier defining an aperture therethrough in flow communication with said bore;
said body defining a pocket on one side of said barrier opposite said bore, said pocket defined by a sidewall; and
said barrier having an edge portion encapsulated in said body, said encapsulated edge portion extending beyond said sidewall of said pocket.

12. The sensor assembly of claim 11, including a substantially continuous strip of sealant bonded to said sidewall and said barrier in said pocket.

13. The sensor assembly of claim 11, said body being plastic.

14. The sensor assembly of claim 11, said barrier being metal.

15. The sensor assembly of claim 11, said body being plastic and said barrier being metal.

16. The sensor assembly of claim 15, including a pressure sensing chip in said pocket attached to said barrier and covering said aperture.

17. The sensor assembly of claim 11, including a pressure sensing chip in said pocket attached to said barrier and covering said aperture.

* * * * *